United States Patent [19]

Butler

[11] Patent Number: 5,916,534
[45] Date of Patent: Jun. 29, 1999

[54] NOBLE METAL RECOVERY USING SELECTED BASE METAL SOLUBILIZING AGENTS AT LOW PULP DENSITIES

[76] Inventor: Dean Butler, P.O. Box 232, Hahndorf, South Australia, Australia

[21] Appl. No.: 08/804,946

[22] Filed: Feb. 24, 1997

Related U.S. Application Data

[63] Continuation of application No. 08/425,626, Apr. 20, 1995, abandoned.

[30] Foreign Application Priority Data

| Apr. 20, 1994 | [AU] | Australia | PM5216 |
| Apr. 22, 1994 | [AU] | Australia | PM5273 |
| May 24, 1994 | [AU] | Australia | PM5859 |

[51] Int. Cl.⁶ .................................................. C22B 11/00
[52] U.S. Cl. ......................... 423/22; 423/27; 423/29
[58] Field of Search ................... 423/22, 29, 27, 423/30, 31, 32, 38, 41; 75/744

[56] References Cited

U.S. PATENT DOCUMENTS

| 2,131,535 | 9/1938 | Hedley | 423/29 |
| 2,234,140 | 3/1941 | Falconer et al. | 423/29 |
| 2,839,387 | 6/1958 | Burton | 423/29 |
| 4,098,867 | 7/1978 | Grinstead et al. | 423/24 |
| 4,269,621 | 5/1981 | Reiner et al. | 75/101 BE |
| 5,055,199 | 10/1991 | O'Neill et al. | 210/684 |
| 5,061,459 | 10/1991 | Bennett et al. | 423/29 |
| 5,147,617 | 9/1992 | Touro et al. | 423/27 |
| 5,147,618 | 9/1992 | Touro et al. | 423/27 |
| 5,215,574 | 6/1993 | Kladder et al. | 423/29 |
| 5,336,474 | 8/1994 | Diehl et al. | 423/29 |
| 5,427,606 | 6/1995 | Sceresini | 423/29 |

FOREIGN PATENT DOCUMENTS

| 548420 | 11/1957 | Canada | 423/29 |
| 552569 | 2/1958 | Canada | 423/29 |
| 604070 | 8/1960 | Canada | 423/29 |
| 0250666 | 1/1986 | European Pat. Off. . | |
| 554290 | 6/1943 | United Kingdom | 423/29 |
| 90/10721 | 9/1990 | WIPO | 423/22 |

OTHER PUBLICATIONS

Dr. H. van Michaelis, "Recovering Gold and Silver From Pregnant Leach Solutions: Zinc Dust, Carbon Handling and Regeneration, and Ion Exchange", Engineering and Mining Journal, Jun. 1987, vol. 188, No. 6, pp. 50–55.

*Primary Examiner*—Steven Bos
*Attorney, Agent, or Firm*—Synnestvedt & Lechner LLP

[57] ABSTRACT

Gold and other noble metal recovery from an ore slurry is improved by operating at low pulp densities, below 35%, and solubilizing base metal present in the slurry by adding to the slurry, either prior to or during the leaching step, one or more solubilizing agents for the base metal.

16 Claims, No Drawings

NOBLE METAL RECOVERY USING SELECTED BASE METAL SOLUBILIZING AGENTS AT LOW PULP DENSITIES

This is a continuation of application Ser. No. 08/425,626, filed on Apr. 20, 1995, now abandoned.

This invention relates to improvements in recovery of noble metals from ores and tailings. Throughout this specification noble metals are intended to include gold, silver and the platinum group.

This invention is partly predicated on the discovery that noble metals in extremely fine form are often present in higher concentrations than is revealed by normal assay techniques in common use.

BACKGROUND TO THE INVENTION

For example, platinum or gold ores can contain more metal than that recovered in conventional wet chemical or fire-assay methods. It is thought that where there are noble metal absorbing materials derived from the ore some of the noble metal taken into solution becomes adsorbed onto these materials and is not detected. In the case of gold leached into solution by aqua regia in wet assays or by cyanide in the cyanide extraction process, the gold complex becomes absorbed by such materials and is thus undetected by solution assay. Conventionally, gold leached by the cyanide process, usually at pulp densities of 35 to 50%, may be recovered from the leach solution in a subsequent stage by contacting the solution or pulp with activated carbon, usually in a concentration range of 10 to 20 grams of carbon per litre of solution [carbon in pulp (CIP) process], but on occasions up to 40 grams per litre have been used. In some instances the carbon has been added to the leaching circuit as well (CIL process), in the same concentration ranges in order to improve gold leach rates so that the gold recorded equated with the assayed grade of the ore.

The conventional assay technique for gold is either by the wet method, which is leaching with aqua regia followed by measurement of the dissolved gold by atomic absorption spectroscopy or similar techniques, or by fire assay. In some instances when the recovery of gold by the CIP process was not up to the assayed grade, adoption of the CIL process, with addition of carbon to the leach circuit resulted in increased recovery. The amount of carbon was increased, in some cases to 40 grams per litre, until the head grade recovery was achieved. In other instances the carbon in leach (CIL) process was adopted to improve gold leach rates and gold recovery rates and thereby decrease the required number of carbon contacting tanks, thus decreasing the capital cost of construction of the gold recovery plant. In some circumstances, however, increasing the carbon loadings to the leach vessel, or the subsequent contacting stages, was found to be undesirable because of the formation of fine carbon particles caused by attrition during pulp agitation. The consequent loss of carbon with its attached gold reduced the effectiveness of the process. However, previously it was not suspected that there were also undetected values of metal in some ore samples. These comments also apply to ore concentrate and tailings.

Attempts to increase gold recovery by increasing the solubility of gold by using chelating agents have been previously proposed. There has also been a disclosure in related U.S. Pat. Nos. 5,147,617 and 5,147,618 of adding a chelating agent to solubilise insoluble salts which would block the pores of the ore, prior to leaching with $SO_2$ in recovering the gold by an anion exchange resin in the presence of oxygen. In this unusual leaching process the addition of the chelating agent increased gold yields by 5 to 10%.

It is an object of this invention to improve recovery rates of noble metals including gold.

SUMMARY OF THE INVENTION

To this end, the present invention provides a method of improving noble metal yields which comprises treating a noble metal containing ore slurry at pulp densities below 35% with an agent for solubilising metal compounds present in the ore slurry which act as adsorbents for noble metals. Pulp density is the weight of solids as a % of the total weight of the slurry.

This invention is predicated on the discovery that one of the sources of noble metal adsorbents are base metal compounds present in the ore slurry.

DETAILED DESCRIPTION OF INVENTION

Test work carried out on some noble metal ores indicated that gold and other noble metals were complexed by cyanide in solution to form negatively charged noble metal cyanide complexes. These complexes are thought to be adsorbed onto ore particles and thus were not analysable in the leach liquor. These gold complexes were capable of being recovered from the ore particles by contacting the pulp with activated carbon or certain ion exchange resins and transferring the gold complexes to the adsorbent by the process of contact transfer. The solubilisation is pulp density dependent and gold recovery rates increase with decreasing pulp density. Improvement in gold recovery is usually detected below 35% pulp density and preferred pulp densities are below 25%.

The use of a chelating agent or solubilising agent to solubilise base metals which are in an insoluble form will remove adsorption sites for precious metal complexes and allow previously adsorbed complexes to report to the liquor phase in a leach pulp.

The base metal compounds are present as precipitates in the slurry and contain sites which act to adsorb noble metal. An appropriate solubilising agent is thought to prevent these base metal ions from forming insoluble precipitates which could then remove noble metal values from the slurry.

The precipitates which are thought to have a major role in this effect are those derived from lead which is solubilised in the leach and which then forms salts which are insoluble under leach conditions, however other base metals may also be involved in this effect.

The chelating ore solubilising agent is preferably an organic complexing agent selected from the following classes of compounds:

1) β-diketones such as acetylacetone.
2) Amino polycarboxylates such as imino diacetic acid and ethylene diamine tetraacetic acid (EDTA).
3) carboxylates such as citrates, acetates or sodium oxalate.
4) Polyphosphonates such as ethyl hydroxy diphosphonate.
5) Polyamines such as ethylene diamine.

These are preferably added as soluble agents but may be added as functional groups on the surface of resin beads. The main drawback of the use of resin beads e.g. chelating resin beads is that the volume of the slurry is increased and the effective concentration of agent needs to be higher.

The amount of chelating agent required corresponds to the quantity needed to prevent the base metal precipitates forming in the slurry. This quantity is usually based on the content of lead or other base metals in the ore. Generally, it has been found that about 2% by weight of the slurry of the chelating agent is required to obtain an optimum increase in noble metal recovery. The range of addition can vary from 0.001% upwards with the upper limit for addition being determined by the economics of process. A preferred range is 0.001 to 10% by weight.

The amount of chelating agent in the pulp is calculated using the liquid phase only. Thus at 33% pulp density with a chelate addition rate of 1 kg/cubic metre, the chelate addition is equal to 2 kg/tonne of ore.

The solubilising or chelating agent can be added either:

(1) as a pre-treatment prior to a conventional extraction or leaching process;
(2) during the leaching process itself; or
(3) a combination of (1) and (2).

This invention is particularly applicable to gold recovery from ores containing lead compounds wherein the gold is leached in a conventional cyanide leach. Where the gold is recovered by a carbon in pulp (CIP) process the cationic complex solubilising agent can be added to the pulp at any time prior to contacting the carbon circuit with the pulp. Thus it could be added prior to commencing the cyanide leach or at any time during the leach or just prior to entering the carbon circuit. In the carbon in leach (CIL) process, the chelating agent needs to be present prior to or during the leach.

In preparing the ore for leaching it is conventional to grind the ore. In this invention it is preferred to grind the ore in such a way as to avoid large quantities by weight of particles less than 45 microns in size. The collecting agent used should have a higher preference for gold or noble metal complexes than the cationic complexes or the solubilising agents themselves. For this reason many ion exchange resins are unsuitable and carbon is the preferred collecting agent.

A preferred adsorbent is activated carbon which adsorbs chelated base metals and chelating agents to relatively low levels. This enables the gold to load readily onto the carbon and minimises the need for chelating agent additions. The process is most efficient when the carbon addition rate is high, however high carbon rates cause high attrition rates of the carbon. This attrition may be minimised by countercurrent contact of the pulp and carbon in a vertical column or columns. This form of contact allows the maximum carbon addition rates to be used with minimal attrition of the carbon. The process may, however be operated to advantage in a standard carbon in leach (CIL) circuit. The use of the process with an adsorbent in the leach permits the use of finer milling of the ore than is optimal when an adsorbent is not present.

When high carbon loadings are used higher pulp densities above 35% may also be used as the effectiveness of the chelating agent at high pulp densities is improved at high carbon loadings.

The process may be used with gold lixiviants other than cyanide provided that the pH of the pulp is high enough for the reaction of the chelating agent with metals to occur.

The most suitable solubilising agents tested are derived from E.D.T.A. (Ethylene Diamine Tetraacetic Acid). One such suitable agent is hydroxyethylethylenediaminetriacetic acid trisodium salt (known as $Na_3$ HEDTA) sold under the trade name Trilon D.

If this Trilon D is added to a cyanide leach, then higher levels of gold report to the leach liquor than are revealed by fire assay or other traditional methods of analysis.

EXAMPLE 1

A sample of ore tailings from a base metal mine at Mount Isa was used, the fire assay of this material is 0.06 ppm gold.

10 g of this ore was placed in a beaker with 100 ml water, 0.01 g of sodium cyanide and 0.5 ml of Trilon D.

After 30 minutes the liquor was analysed and found to contain 0.2 ppm gold.

This represents a head grade of 2.0 ppm gold in the head ore.

A duplicate leach gave a head grade of 1.8 ppm gold in the head ore.

EXAMPLE 2

The following examples show the effect of varying pulp densities on Bamboo Creek ore using Tetra sodium EDTA and comparative examples without a chelating agent.

Pulp Density 50%

EXAMPLE 2A 100 ml water, 0.1 g NaCN, 0.2 g EDTA, 100 g ore pH 11.1

| | | |
|---|---|---|
| 1 hr | pH 10.0 | 3.3 ppm Au in liquor |
| 3 hr | pH 9.97 | 6.8 ppm Au in liquor |
| 14 hr | pH 9.9 | 9.1 ppm Au in liquor |

EXAMPLE 2B 100 ml water, 0.1 g NaCN, 100 g ore pH 9.5 No EDTA added

| | | |
|---|---|---|
| 1 hr | pH 9.6 | 3.8 ppm Au in liquor |
| 3 hr | pH 9.8 | 7.6 ppm Au in liquor |
| 14 hr | pH 9.3 | 9.8 ppm Au in liquor |

Pulp Density 33%

EXAMPLE 2C 100 ml water, 0.1 g NaCN, 0.2 g EDTA, 50 g ore pH 11.2

| | | |
|---|---|---|
| 1 hr | pH 10.17 | 3.4 ppm Au in liquor |
| 3 hr | pH 10.6 | 5.4 ppm Au in liquor |
| 14 hr | pH 11.1 | 12.2 ppm Au in liquor |

EXAMPLE 2D 100 ml water, 0.1 g NaCN, 50 g ore pH 9.9 No EDTA added

| | | |
|---|---|---|
| 1 hr | pH 9.8 | 3.0 ppm Au in liquor |
| 3 hr | pH 9.6 | 6.9 ppm Au in liquor |
| 14 hr | pH 9.7 | 9.3 ppm Au in liquor |

Pulp Density 20%

EXAMPLE 2E 120 ml water, 0.1 g NaCN, 0.2 g EDTA, 30 g ore pH 11.2

| | | |
|---|---|---|
| 1 hr | pH 11.3 | 5.6 ppm Au in liquor |
| 3 hr | pH 11.5 | 13.6 ppm Au in liquor |
| 14 hr | pH 11.6 | 17.2 ppm Au in liquor |

EXAMPLE 2F 120 ml water, 0.1 g NaCN, 30 g ore pH 9.8 No EDTA added

| | | |
|---|---|---|
| 1 hr | pH 10.1 | 4.6 ppm Au in liquor |
| 3 hr | pH 9.9 | 7.6 ppm Au in liquor |
| 14 hr | pH 9.8 | 10.2 ppm Au in liquor |

Pulp Density 10%

EXAMPLE 2G 135 ml water, 0.1 g NaCN, 0.13 g EDTA, 15 g ore pH 11.2

| | | |
|---|---|---|
| 1 hr | pH 11.3 | 4.1 ppm Au in liquor |
| 3 hr | pH 11.5 | 8.6 ppm Au in liquor |
| 14 hr | pH 11.6 | 18.9 ppm Au in liquor |

EXAMPLE 2H 135 ml water, 0.1 g NaCN, 15 g ore pH 10.0 No EDTA added

| | | |
|---|---|---|
| 1 hr | pH 10.1 | 4.4 ppm Au in liquor |
| 3 hr | pH 10.0 | 8.1 ppm Au in liquor |
| 14 hr | pH 9.8 | 10.9 ppm Au in liquor |

Pulp Density 5%

EXAMPLE 2I 190 ml water, 0.2 g NaCN, 0.19 g EDTA, 10 g ore pH 11.2

| | | |
|---|---|---|
| 1 hr | pH 11.2 | 3.1 ppm Au in liquor |
| 3 hr | pH 11.3 | 6.5 ppm Au in liquor |
| 14 hr | pH 11.75 | 18.3 ppm Au in liquor |

EXAMPLE 2J 190 ml water, 0.2 g NaCN, 10 g ore pH 10.1 No EDTA added

| | | |
|---|---|---|
| 1 hr | pH 10.2 | 4.3 ppm Au in liquor |
| 3 hr | pH 10.3 | 8.0 ppm Au in liquor |
| 14 hr | pH 10.0 | 11.4 ppm Au in liquor |

EXAMPLE 3

Chelating Agent Addition Rates

Chelating addition rates were tested with Bamboo Creek ore. The leach solutions comprised 500 ml water with 0.5 g sodium cyanide. Varying quantities of di sodium E.D.T.A. were added to separate leaches. Pulp density 20%.

| EDTA addition (g/l) | Au solubilised (ppm in head ore) |
|---|---|
| 0.5 | 15.8 |
| 1.0 | 16.9 |
| 2.0 | 24.0 |
| 4.0 | 26.2 |
| 8.0 | 24.6 |

EXAMPLE 4

Particle Size Effects

An important feature of this process is the size to which the ore is milled. The production of large amounts of a fine fraction (<45μm) inhibits both the ability to fire assay and to leach the gold in the ore. This was demonstrated by screening some of the above ore at 45μm. The <45μm fraction fire assayed at 12.1 ppm Au. Standard cyanide recovery from this fraction was 6.2 ppm Au. When a chelate was added to the leach the recovery was 12.6 ppm.

The >45μm fraction fire assayed at 69 ppm Au. Standard cyanide recovery from this fraction was 47 ppm Au. When a chelate was added to the leach the recovery was 93 ppm. Thus recovery of gold not detected by conventional assay methods may be effected provided that the ore has not been ground so fine as to expose the interferent to the degree that it may solubilise at a rate which allows it to interfere with the leaching and retention of gold in the pulp liquor.

EXAMPLE 5

Alternative Solubilising Agents

Each of the following tests were carried out in a 1 litre beaker with downthrust agitation from a 50 mm diameter stainless steel impeller. No air sparging was carried out.

EXAMPLE 5A

Acetylacetone

Starting conditions 500 ml water, 2 ml acetylacetone, 0.5 g sodium cyanide, NaOH to pH 10.6, 10g Bamboo Creek ore.

After 24 hrs, pH 10.5, Au recovered in liquor=20.4 ppm in head ore.

EXAMPLE 5B

Iminodiacetic Acid

Starting conditions 500 ml water, 1 g IDA, 0.5 g sodium cyanide, 10g Bamboo creek ore, pH 11.3.

After 24 hrs, pH 10.86, Au recovered in liquor=20.6 ppm in head ore.

EXAMPLE 5C

Sodium Oxalate

Starting conditions 500 ml water, 1 g sodium oxalate, 0.5 g sodium cyanide, 10 g Bamboo creek ore.

After 24 hrs, pH 11.14, Au recovered in liquor=19 ppm in head ore.

EXAMPLE 5D

Ethylhydroxydiphosphonate
Starting conditions
   500 ml water, 1 g ethylhydroxydiphosphonate, 0.5 g sodium cyanide, 10 g Bamboo creek ore. pH 11.0.
   After 24 hrs, pH 10.7, Au recovered in liquor=21.8 ppm in head ore.

EXAMPLE 5E

Ethylenediamine
Starting conditions:
   500 ml water, 2 ml ethylenediamine, 0.5 g sodium cyanide, 10 g Bamboo creek ore. pH 11.3.
   After 24 hrs, pH 10.86, Au recovered in liquor=20.4 ppm in head ore.

EXAMPLE 6

Non Agitated Leach

The leaching of gold need not necessarily be carried out under agitated conditions. Testwork was carried out on an ore from Cripple Creek in Colorado, U.S.A. The ore was contacted with a leach solution in a beaker and left undisturbed, the leach solution was sampled and analysed for gold every 7 days.

The head grade of the ore was 0.9 ppm Au by fire assay. 10 g of this ore were contacted with a leach solution comprising 500 ml water, 4 ml Trilon D as a chelating agent, 0.5 g sodium cyanide with pH adjusted to 10.5 using NaOH. The results were as follows:

| Day | Au in liquor grade (ppm) |
| --- | --- |
| 1 | <0.01 |
| 7 | <0.01 |
| 14 | 0.005 |
| 21 | 0.877 |
| 28 | 0.018 |
| 35 | 0.026 |

The high liquor grade on day 21 represents a gold head grade in the ore of 24.85 ppm. This is substantially in excess of the grade by fire assay. The outstanding effect in this test is the readsorption of the gold from the liquor between days 21 and 28. This gold was not detected by fire assay of the ore residue at the completion of the test.

EXAMPLE 7

Carbon In Leach (CIL)
Starting conditions
   400 ml water, 2g Na2EDTA, 0.5g NaCN, 30g Carbon, 10g Bamboo Creek ore.
   Agitated in a 1 litre beaker for 24 hours at pH 10.6
   Liquor grade 0.0 ppm AU
   Carbon ashed and ash digested in 200 ml aqua regia revealed gold grade equivalent to 26.4 ppm in head ore.

EXAMPLE 8

Palladium Recovery

Head grade of palladium ore=0.23 ppm palladium
   400 ml water, 2g Na2EDTA, 2 ml NaOCl, HCl to pH 3.4, log ore, 35 g carbon.
   Agitated in a 1 litre beaker for 1 hour.
   Liquor grade 0.0 ppm Pd.
   Carbon ashed and ash digested in 200 ml aqua regia with NaOCl revealed palladium grade of 2.4 ppm in head ore.

What is claimed is:

1. In a method of recovering noble metal values from an ore that contains a noble metal and an insoluble base metal compound in which an ore slurry is contacted with a leaching agent and noble metal values are subsequently recovered from solution in a noble metal collection step by adsorption onto a noble metal collection agent, the improvement comprising maintaining the pulp density of the ore slurry below 33% and solubilizing insoluble base metal compound which is present in the slurry and which acts as an adsorbent for the noble metal by adding to the ore slurry, prior to the noble metal collection step, a solubilizing agent for said base metal compound in an amount sufficient for solubilizing the base metal compound, wherein the solubilizing agent is selected from the group consisting of β-diketones, amino polycarboxylic acids, salts of amino polycarboxylic acids, carboxylic acids, salts of carboxylic acids, and polyphosphonates.

2. A method according to claim 1, wherein the solubilizing agent is a chelating agent added in an amount of at least 0.001% by weight of the slurry.

3. The method according to claim 1 wherein the ore includes gold and the insoluble base metal compound adsorbs gold.

4. The method according to claim 1 wherein the ore includes gold and gold values are recovered.

5. The method according to claim 1 wherein said solubilizing agent is ethylenediaminetetraacetic acid.

6. The method according to claim 1 wherein said pulp density is maintained between 10% and 33%.

7. In a method of recovering gold from gold containing ore in which water insoluble base metal compounds are present, in which method the ore is formed into a slurry and subjected to a cyanide leach followed by extraction of the gold by addition of carbon as the collecting agent in a carbon addition step, this method comprising either a carbon in leach (CIL) or carbon in pulp (CIP) process, the improvement comprising maintaining the pulp density of the ore slurry below 33% and adding to the ore slurry, prior to the carbon addition step, at least 0.001% by weight of the slurry of a chelating agent which preferentially complexes with base metals in the slurry, wherein the chelating agent is selected from the group consisting of β-diketones, amino polycarboxylic acids, salts of amino polycarboxylic acids, carboxylic acids, salts of carboxylic acids, and polyphosphonates.

8. The method according to claim 7 wherein said chelating agent is ethylenediaminetetraacetic acid.

9. The method according to claim 7 wherein said pulp density is maintained between 10% and 33%.

10. In a method of recovering noble metal values from an ore that contains a noble metal and insoluble base metal compounds in which an ore slurry is contacted with a leaching agent and noble metal values are subsequently recovered from solution in a noble metal collection step by adsorption onto a noble metal collection agent, the improvement comprising maintaining the pulp density of the ore slurry below 25% and solubilizing insoluble base metal compounds which are present in the slurry and which are adsorbents for the noble metal by adding to the ore slurry, prior to the noble metal collection step, a solubilizing agent for said base metal compounds in an amount sufficient to solubilize said insoluble base metal compounds, the amount of noble metal value recovered in said noble metal collection step being greater than that which would be obtained from said ore slurry without said addition of said solubilizing agent.

11. A method according to claim 10, wherein the solubilising agent is a chelating agent selected from the group consisting of β-diketones, amino polycarboxylic acids or salts, carboxylic acids or salts, polyphosphonates and polyamines.

12. The method according to claim 10, wherein the solubilizing agent is a chelating agent added in an amount of at least 0.001% by weight of the slurry.

13. The method according to claim 10 wherein the ore includes gold and the insoluble base metal compounds adsorb gold.

14. The method according to claim 10 wherein said solubilizing agent is ethylenediaminetetraacetic acid.

15. In a method of recovering noble metal values from an ore that contains a noble metal and an insoluble base metal in which an ore slurry is contacted with a leaching agent and noble metal values are subsequently recovered from solution in a noble metal collection step by adsorption onto a noble metal collection agent, the improvement comprising maintaining the pulp density of the ore slurry between 10% and 33% and solubilizing insoluble base metal which is present in the slurry and which acts as an adsorbent for the noble metal by adding to the ore slurry, prior to the noble metal collection step, a chelating agent in an amount sufficient to solubilize said insoluble base metal, said chelating agent being a solubilizing agent for said base metal.

16. A method according to claim 15, wherein the solubilizing agent is a chelating agent selected from the group consisting of β-diketones, amino polycarboxylic acids or salts, carboxylic acids or salts, polyphosphonates and polyamines.

* * * * *